United States Patent Office 3,538,185
Patented Nov. 3, 1970

3,538,185
COATING COMPOSITIONS CONTAINING VINYL POLYMERS WITH PENDANT ALKYLENIMINE GROUP AND EPOXY RESINS
Lem Davis, Jr., and Paul A. Larson, Lake Jackson, and Russell T. McFadden, Freeport, Tex., assignors to The Dow Chemical Company, Midland, Mich., a corporation of Delaware
No Drawing. Filed Aug. 10, 1967, Ser. No. 659,604
Int. Cl. C08g 45/04
U.S. Cl. 260—837    12 Claims

ABSTRACT OF THE DISCLOSURE

Epoxy resin coating having improved resistance to yellowing are prepared from a mixture of a polyepoxide resin and an amine hardening agent where the hardening agent is a vinyl copolymer containing pendant aminoester groups. The hardening agent is readily prepared by reacting a vinyl copolymer containing pendant carboxylic acid groups with an alkylenimine or with certain N-substituted alkylenimines.

This invention relates to epoxy resin coatings having improved resistance to yellowing. More particularly the invention relates to coating compositions cured with a vinyl polymer hardening agent having pendant aminoester groups.

Coatings based on epoxy resins provide good solvent resistance, hardness, adhesion, and the like but are notable for their tendency to yellow and chalk when exposed to ultra violet light and other weathering conditions. This yellowing tendency is particularly evident when amines, such as diethylene triamine and the like, are utilized as curing agents.

In addition to the commonly used polyalkylene polyamines, U.S. 3,228,823 discloses the use of an aminoester modified vinyl polymer with epoxy resins as an adhesive for polyvinylfluoride laminates. However, the adhesive composition of the patent usually requires the addition of amine curing agents in addition to the aminoester vinyl polymer, and the patent indicates a need for ultra violet light absorbers or anti-oxidants when clear polyvinylfluoride film is laminated to plywood.

The elimination of yellowing or improvements in resistance to yellowing of epoxy based coatings would considerably broaden the commercial market for such coatings and paints and has been a long sought-after goal.

It is an object of this invention to provide novel epoxy based coatings which have improved resistance to yellowing and weathering conditions. It is a further object to utilize a vinyl copolymer containing pendant aminoester groups as the hardening agent for the epoxy coating. These and other objects and advantages will be apparent from the following description of the invention.

Accordingly the objects of this invention are accomplished by preparing a coating composition comprised of a polyepoxide resin having more than one oxirane group per molecule admixed with a hardening agent consisting of a vinyl copolymer containing pendant aminoester groups. The aminoester group depends from the carbon-carbon polymeric backbone and has the formula

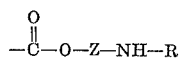

wherein Z is an alkylene group containing from 2 to 4 carbon atoms of which at least two carbon atoms extend in a chain between the O and the N, and R is selected from the group consisting of

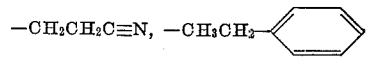

and (—ANH)$_n$H where $n$ is an integer of 1 to 4 and A is an alkylene group of 2 to 4 carbon atoms of which at least two carbon atoms extend in a chain between the nitrogen atoms. The coating compositions are preferably prepared as solutions in a volatile inert organic solvent.

A wide variety of polyepoxide resins may be readily made or are commercially available to prepare the coating compositions. One of the preferred classes of epoxy resins include the glycidyl polyethers of polyhydric phenols such as 4,4'-isopropylidene diphenol, commonly called bisphenol A. Other polyhydric phenols include resorcinol, catechol, hydroquinone, p,p'-dihydroxydiphenyl, p,p'-dihydroxy phenyl sulfone and the like. Flame retardant or self-extinguishing resins can be readily made from the halogen substituted, preferably bromine substituted, polyhydric phenols. The resins are generally made by reacting an epihalohydrin with the polyhydric phenol in the presence of a strong base. Typically these resins contain more than one oxirane group,

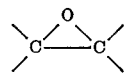

per molecule, and the epoxide equivalent weight is defined as the weight in grams of the resin which contains one gram equivalent of epoxide.

Other polyepoxide resins which contain more than one epoxide group per molecule are glycidyl polyethers of polyhydric alcohols, glycidyl polyethers of novolac resins (commonly called epoxy novolacs) and a variety of resins wherein the epoxide group is introduced into the resin by the epoxidation of double bonds. The glycidyl polyethers of polyhydric phenols and polyhydric alcohols having an epoxide equivalent weight from about 150 to 2000 are preferred.

In addition to the polyepoxide resins described, vinyl polymers containing pendant glycidyl groups may also be utilized in this invention. Such vinyl-glycidyl polymers may be made by copolymerizing a wide variety of vinyl monomers with a monomer such as glycidyl methacrylate. Suitable vinyl monomers include those which do not contain a group reactive with the glycidyl group and preferably include the α,β-ethylenically unsaturated carboxylic acid esters of saturated alcohols containing from 1 to about 8 carbon atoms and the monovinyl aromatic monomers of the benzene class such as styrene, vinyl toluene and the like. Preferably the polymer contains from about 5 to about 50 percent by weight of the vinyl-glycidyl monomer. Other suitable vinyl-glycidyl monomers include allyl glycidyl ether, glycidyl acrylate, diglycidyl maleate and the like.

The hardening agent is a vinyl polymer containing pendant aminoester functional groups. The aminoester functional group is most readily introduced by reacting a vinyl polymer containing pendant carboxylic acid groups with an alkylenimine or certain N-substituted alkylenimines.

Polymerized vinyl interpolymers containing carboxylic acid groups are generally prepared from a solution of a mixture of monomers, one of which is a vinyl carboxylic acid monomer. The monomer mixture is polymerized in the presence of a catalyst and usually under controlled elevated temperatures with agitation until the polymerization reaction is complete. Various modifications commonly practiced with solution polymerization reactions can be utilized, modifications such as step-wise addition of the monomer mixture during the polymerization, incremental addition of catalyst, polymerization under an inert atmosphere, continuous or batch polymerization and the like. The details of such polymerization are well known and need not be discussed further herein.

The vinyl carboxylic acid monomers include the $\alpha,\beta$-ethylenically unsaturated monocarboxylic acids such as acrylic, methacrylic, cinnamic, crotonic acids and the like; unsaturated dicarboxylic acids such as maleic, fumaric, itaconic acids and the like; and half esters of the unsaturated dicarboxylic acids cited above. Preferably the vinyl carboxylic acids are unsaturated monocarboxylic acids and most preferred are acrylic and methacrylic acid.

The vinyl interpolymer is prepared by copolymerizing a vinyl carboxylic acid with one or more copolymerizable monomers such as vinyl aromatic monomers, alkyl esters of unsaturated monocarboxylic acids, vinyl and vinylidene chloride and fluoride, N-vinyl pyrrolidone and the like.

Suitable vinyl aromatic monomers include styrene, $\alpha$-methylstyrene, vinyl toluene, the various alkyl substituted styrenes, the various halo substituted styrenes, vinyl naphthalene and the like. The more preferred of these monomers are styrene, $\alpha$-methylstyrene and vinyl toluene. Suitable alkyl esters of unsaturated mono- and dicarboxylic acids include the esters prepared from aliphatic alcohols containing from 1 to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Small amounts of acrylonitrile, less than about 10 percent, may also be used to improve the film properties.

The vinyl interpolymers are preferably prepared to contain from about 1 to about 20 percent by weight of a vinyl carboxylic acid monomer and the balance, to make 100 percent, of one or more of the copolymerizable monomers. Mixtures of vinyl aromatic monomers and alkyl esters of vinyl carboxylic acids may be advantageously used.

Suitable solvents for the polymerization include alcohols, ketones, aromatic hydrocarbons and the like or mixtures thereof, although it is preferred to use alcohols or alcohol/aromatic hydrocarbon mixtures. The polymerization temperature may range from 60° to 140° C., with a preferred range of 80° to 100° C. The particular temperature is variable depending on the monomers, the catalyst and other conditions.

The hardening agents are prepared by an amination reaction in which the vinyl polymer containing pendant carboxylic acid groups is reacted with an alkylenimine or an N-substituted aziridine. Generally, the carboxylic acid is reacted with two or more moles of an alkylenimine per carboxylic acid group preferably within a range of 2–5 moles. One or more moles of an N-(aminoalkyl) aziridine may be reacted with each mole of carboxylic acid, preferable 1 to 1.5 moles. Additionally, one mole of N-(2-cyanoethyl) aziridine or N-(2-phenylethyl) aziridine may be reacted per equivalent of carboxylic acid. The reaction is best conducted above 50° C. and preferably from 70° to 90° C. and is preferably run in a solvent. Suitable solvents for the amination reaction include aromatic hydrocarbons, ketones and alcohols.

Suitable alkylenimines include the 1,2-alkylenimines such as ethylenimine, propylenimine, butylenimine and the like; the analogous 1,3-alkylenimines may also be used. Ethylenimine and propylenimine are readily available in commercial quantities and are the preferred alkylenimines. Particularly valuable are the N-(aminoalkyl) aziridines since they react similarly to the alkylenimines with a carboxylic acid group but are less volatile. Suitable such aziridines are N-(2-aminoethyl) aziridine, N-(3-aminopropyl) aziridine, N-(2-aminopropyl) aziridine and the like.

The hardening agent may have a wide range of molecular weights, and may be combined with the polyepoxide in the proportions of about 0.5 to about 1.5 amine hydrogen equivalent weights per epoxide equivalent weight. Generally a range closer to stoichiometric ratios is preferred.

The amine hydrogen equivalent weight of the hardening agent is obtained as follows:

A weighed sample of the polymer solution is reacted with an excess of phenyl glycidyl ether (PGE) as a 5% solution in glycol monoethyl ether by refluxing for 1 hour. To the hot solution is added an aliquot of hydrochlorination reagent (35 ml. conc. HCl, 250 ml. of pyridine and 750 ml. of glycol monoethyl ether) and the mixture is refluxed for 40 additional minutes. After cooling, the remaining pyridinium chloride is titrated with 0.2 N KOH in ethanol to a cresol red endpoint. The amine hydrogen equivalent weight is given by:

$$\frac{(\text{Wt. of sample}) \times (\% \text{ Resin Solids}) \times 1000}{(\text{Meq. of KOH}) + (\text{Meq. of PGE}) - (\text{Meq. of Hydrochlorinating Reagent})}$$

Although it is preferred to prepare the hardening agent as hereinbefore described it should be clearly understood that the hardening agent may be prepared directly from monomer mixtures containing a monomer having the desired aminoester groups. Such polymers can be made by conventional polymerization procedures and techniques.

The epoxy resin coating compositions of this invention are generally prepared as solutions in volatile inert organic solvents. A variety of solvents may be used since the invention is not dependent on any unique solvent or solvent system. Usually the choice of a solvent is determined by the coating requirements, application requirements, resin compatability, solvent evaporation rate, viscosity, affect of solvent on gloss, cost and the like. Suitable solvents include aromatics such as xylene or toluene, ketones, glycol ethers, glycol ether esters, alcohols and the like and mixtures thereof.

The epoxy resin coating compositions may vary considerably in solids content ranging from about 1 percent up to 40–50 percent or even higher depending upon the particular application. The compositions may also be formulated with pigments, dyes, inert fillers such as clays, plasticizers, anti-oxidants, stabilizers, catalysts and the like.

Methods of applying the coatings include such conventional methods as spraying, brushing, dipping, flowing or roller coating. The coatings may be air dried at ambient temperature or may be baked by conventional methods to harden and insolubilize them. Curing times and temperatures are not critical, ranging from air drying at ambient temperatures for several days to baking for a few minutes at elevated temperatures up to about 175° C. or higher.

The following non-limiting examples are provided to illustrate the present invention but its scope is not limited to the exact details of the examples. All parts and percentages are by weight unless otherwise specified. The following terms and tests are used in the examples:

Gloss: The gloss at 60° C. was measured in a Gardner Gloss-O-Meter. Coated panels were exposed to ultra violet light for varying periods of time at elevated temperatures and remeasured to determine the change in gloss.

Yellowing, Thermal: Thermal yellowing is rated by a visual comparison of coated panels after 90 hours of exposure at 140° C. on a scale from 0–10 with 0 being no change and 10 being a severe change in color.

Yellowing, U.V. Ultra violet yellowing was determined visually on the same scale as for thermal yellowing after exposure for varying periods of time in a Fade-Ometer at 110° F.

Impact: Impact is measured as the inch-pounds of impact to rupture the film.

Flex: Flex is measured as to whether the coating passes or fails a ⅛″ conical mandrel bend.

Solvent resistance: Solvent resistance was measured with different solvents or solutions as follows: Methyl ethyl ketone (MEK)—spot test, time in minutes to fail when rubbed with a cotton swab ("Q" tip). Glacial acetic acid—spot test, time in minutes to blister.

EXAMPLE 1

A series of hardeners according to this invention was prepared to compare with two conventional hardeners, diethylene triamine (DET) and a polyamide, (commercially available as Versamid 125) prepared essentially by reacting a polyalkylenepolyamine with polymerized vegetable oil acids (reference "Polyamide Resins" D. E. Floyd, Reinhold Publishing Corp., 2nd edition, pp. 24–26).

Hardener A

To a 5-liter reactor equipped with a reflux condenser, stirrer, temperature control, means for purging, etc. was charged a solvent mixture of 300 gms. of toluene, 300 gms. of methyl ethyl ketone (MEK) and 200 gms. of isopropyl alcohol. After purging the reactor with methane, agitation was begun and the solvent heated to 90° C. Then a mixture of 140 gms. of methyl methacrylate, 260 gms. of ethyl acrylate, 50 gms. of methacrylic acid and 4.5 gms. of catalyst, azobisisobutyronitrile, was added over about a 3 hour period. After the addition of the monomers the mixture was digested for 15 hours at 90° C. The polymer solution was cooled to 70° C., and 50 gms. of ethylenimine was added dropwise over a one hour period and the resin solution digested at 70° C. for three hours. The vinyl polymer hardener had an amine hydrogen equivalent weight (AHEW) of about 930.

Hardener B

In a manner similar to that used to prepare Hardener A, Hardener B was prepared from 200 gms. styrene, 250 gms. butyl acrylate, 50 gms. methacrylic acid and 5.0 gms. of catalyst followed by reaction with 50 gms. of ethylenimine. The solvent was a mixture of 250 gms. of toluene, 125 gms. MEK and 125 gms. of isopropyl alcohol. Hardener B had an AHEW of about 679.

Hardener C

Similarly, Hardener C was prepared from 250 gms. of styrene, 150 gms. of butyl acrylate, 100 gms. of methacrylic acid and 5.0 gms. of catalyst in a solvent consisting of 250 gms. toluene, 250 gms. of MEK and 100 gms. of ethyl alcohol. The polymer was reacted with 100 gms. of ethylenimine and Hardener C had an AHEW of about 380.

EXAMPLE 2

A white pigmented epoxy paint base was prepared from the following components:

10 parts of a glycidyl polyether of bisphenol A having an epoxide equivalent weight of about 540
10 parts of a solvent (xylene/diacetone alcohol/methyl isobutyl ketone, 1/1/1)
9 parts titanium dioxide
1 part kaolin clay
0.2 part silicone fluid (Dow Corning DC 840)

The above mixture was ball milled 24 hours using a procelain grinding medium. Approximately stoichiometric amounts of the hardeners of Example 1 were added based on the AHEW and epoxide equivalent weights and the mixtures were reduced in viscosity to 20 seconds as measured by a #4 Ford cup by addition of the above solvent. Coatings were sprayed on "Q" panels to a dry film thickness of about 1 to 1½ mils and allowed to air dry for 7 days. Properties of the coatings were determined and are shown in Table I.

The data in Table I clearly show the improvement in resistance to yellowing obtained from this invention. The data also show that selected properties can be optimized by the choice of the hardener used. For example, Hardener A contributes the most freedom from the U.V. radiation induced yellowing, least thermal yellowing and loss of glass. Hardener C contributes better resistance to chemicals and solvents.

TABLE I.—POLYEPOXIDE COATING PROPERTIES

| | Gloss | | | Yellowing | | Solvent resistance, min. | | Impact | | |
|---|---|---|---|---|---|---|---|---|---|---|
| | Initial | After 200 hrs.[1] | After 500 hrs.[1] | Thermal[2] | U.V.[3] | MEK | Acetic acid | Forward | Reverse | Flex |
| Hardener: | | | | | | | | | | |
| A | 94 | 89 | 77 | 1 | 1 | 3 | 3 | 150 | 70 | Passes. |
| B | 98 | 95 | 82 | 2 | 2 | 1 | 4 | 150 | 25 | Do. |
| C | 94 | 91 | 35 | 1 | 3 | 10 | 32 | 100 | 50 | Do. |
| C[4] | 98 | 92 | 13 | 4 | 5 | 2 | 30 | | 20 | Do. |
| C[5] | 94 | 89 | 44 | 3 | 3 | 10 | 11 | 75 | 50 | Do. |
| Diethylene triamine | 80 | 16 | 3 | 4 | 6 | 10 | 20 | 70 | 30 | Do. |
| Polyamide | 96 | 88 | 10 | 6 | 7 | 10 | 20 | 50 | 10 | Do. |

[1] Exposed in Fade-O-Meter at 110° F.
[2] After exposure for 90 hours at 140° C.
[3] After exposure for 500 hours.
[4] One-half stoichiometric amount of Hardener C employed.
[5] Twice the stoichiometric amount of Hardener C employed.

EXAMPLE 3

Clear coatings were prepared by mixing the polyepoxide of Example 2 with stoichiometric quantities of the indicated hardeners and solvents as shown in Table II.

Hardener D was prepared in a manner similar to the hardeners of Example 1 from 335 gms. of methyl methacrylate, 625 gms. of butyl acrylate, 120 gms. of methacrylic acid and 12 gms. of catalyst in a solvent consisting of 500 gms. MEK, 100 gms. isopropyl alcohol, 500 gms. of xylene and 100 gms. of isobutyl alcohol. The polymer was reacted with 120 gms. of ethylenimine and Hardener D had an AHEW of about 726.

The formulation shown in Table II were sprayed on "Q" panels to a dry film thickness of about 1–1½ mils and air dried for seven days. The coated panels were tested with the results shown in Table III. The excellent resistance of the formulation containing Hardener D to U.V. induced yellowing is to be noted as compared to the formulations using DET or a polyamide as hardening agent.

TABLE II.—POLYEPOXIDE COATING FORMULATIONS

| Hardener | Solvents added, parts by weight of total added solvents | | | | | Percent solids | Viscosity,[3] sec. | Gardner viscosity after— | | | |
|---|---|---|---|---|---|---|---|---|---|---|---|
| | Xylene | MIBK[1] | Isobutyl alcohol | Dowanol EE[2] | MEK | | | 48 hrs. | 72 hrs. | 80 hrs. | 95 hrs. |
| D | 44 | 11 | 30 | 38 | 38 | 33⅓ | 19 | A | D-E | G | Gelled. |
| Diethylene triamine | 39 | 11 | 33 | 33 | 33 | 33⅓ | 23 | Gelled | | | |
| Polyamide | 39 | 11 | 17 | 33 | 33 | 33⅓ | 21 | A | H | Y | Do. |

[1] Methyl isobutyl ketone.  [2] Ethylene glycol monoethyl ether.  [3] No. 4 Ford cup, in seconds.

EXAMPLE 4

A series of coatings was prepared using four different paint bases and three different hardeners. In addition to Hardener B and D from the previous examples Hardener E having an AHEW of about 1227 was used.

Hardener E was prepared similarly to the Hardeners A–D and from 470 gms. of styrene, 580 gms. of butyl acrylate, 75 gms. of methacrylic acid and 11.3 gms. of catalyst in a solvent consisting of 500 gms. of MEK, 100 gms. isopropyl alcohol, 500 gms. xylene and 100 gms. of isobutyl alcohol. The polymer was reacted with 75 gms. of ethylenimine.

The coatings were prepared by adding approximately a stoichiometric amount of hardener based on the polyepoxide content of the paint base and then adding a sufficient quantity of a solvent (a 1:1:1 mixture of xylene, MEK and diacetone alcohol) to reduce the viscosity of the formulation to a spray viscosity of about 20 seconds as measured in a #4 Ford cup.

Paint Base Formulation 2

267 parts of a glycidyl polyether of bisphenol A containing about 10% xylene and having an epoxide equivalent weight of about 230–250
280 parts of xylene (including the above approx. 26.7 parts)
275 parts of MIBK
169 parts of diacetone alcohol
621 parts of titanium dioxide
96 parts of kaolin clay
4.8 parts of the above reaction product of ethylene glycol and polyepoxide dissolved in 2.4 parts of MEK

Paint Base Formulation 3

303 parts of glycidyl polyether of bisphenol A further reacted with additional bisphenol A to give an epoxide equivalent weight of about 409
364 parts of xylene
293 parts of MIBK
598 parts of titanium dioxide
92 parts of kaolin clay

TABLE III.—POLYEPOXIDE COATING PROPERTIES

| Hardener | U.V. yellowing | | | Solvent resistance, min. | | Impact | | Flex | Adhesion[1] |
|---|---|---|---|---|---|---|---|---|---|
| | Initial | After 200 hrs. | After 300 hrs. | MEK | Acetic acid | Forward | Reverse | | |
| D | 0 | 0 | 0–1 | 2 | 17 | 180 | 170 | Passes | 95 |
| Diethylene triamine | 0 | 3 | 5 | 6 | 18 | 160 | 160, do | | 15 |
| Polyamide | 0 | 5 | 5 | 5 | 42 | 190 | 190 do | | 20 |

[1] Adhesion is the percentage of intact coating on crosshatched 100 sq./in. after applying and rapidly stripping Scotch Brand #300 Tape.

The coating formulations were sprayed onto Bonderite #100 panels and air dried for 5–7 days at room temperature before testing. The results are compiled in Table IV.

The four paint bases were prepared by mixing the desired polyepoxide with solvents, pigments and additives and rolled for 24 hours in a crock jar using ceramic balls as a grinding media.

Paint Base Formulation 1

227 parts of a glycidyl polyether of bisphenol A having an epoxide equivalent weight of about 186–192 and containing about 3% of a polyhydric polyether obtained by the reaction of greater than a stoichiometric amount of ethylene glycol with the above polyepoxide
192 parts of diacetone alcohol
256 parts of xylene
256 parts of MIBK
653 parts of titanium dioxide
101 parts of kaolin clay

Paint Base Formulation 4

396 parts of a glycidyl polyether of bisphenol A having an epoxide equivalent weight of about 475–575
119 parts of xylene
126 parts of MIBK
258 parts of diacetone alcohol
594 parts of titanium dioxide
92 parts of kaolin clay
8 parts of a polyhydric polyether obtained by the reaction of greater than a stoichiometric amount of ethylene glycol with the polyepoxide of Paint Formulation 1 dissolved in 4 parts of MEK The excellent resistance of these coatings to yellowing by ultra violet should be noted. In addition to the properties listed in Table IV all the coatings had good flexibility and resistance to solvents and chemicals such as water, toluene, MEK, ethylacetate, alkali solutions and acid solutions.

TABLE IV.—PIGMENTED POLYEPOXIDE COATING PROPERTIES

| Paint base formulation | Hardener No. | Hardener PHR [1] | Salt fog test, mm. [2] | Impact Forward | Impact Reverse | Gloss Initial | Gloss After 450 hrs.[3] | U.V. Yellowing-formula after 450 hrs.[3] |
|---|---|---|---|---|---|---|---|---|
| 4 | B | 60 | 5.0 | 140 | 70 | 93 | 68 | 0-½ |
|   | D | 62 | 2.4 | 100 | 50 | 95 | 76 | 0-½ |
|   | E | 96 | 3.7 | 100 | 25 | 90 | 86 | 1 |
| 3 | B | 84 | 1.1 | 140 | 90 | 100 | 74 | 0-½ |
|   | D | 87 | 2.9 | 120 | 50 | 96 | 80 | 0-½ |
|   | E | 134 | 4.0 | 150 | 70 | 93 | 72 | 0-½ |
| 2 | B | 134 | 2.6 | 50 | 15 | 93 | 85 | 0-½ |
|   | D | 139 | 2.7 | 100 | 25 | 94 | 70 | ½ |
|   | E | 216 | 3.1 | 150 | 100 | 93 | 82 | 0-½ |
| 1 | B | 172 | 0.9 | 40 | 30 | 96 | 80 | ½ |
|   | D | 179 | 1.9 | 75 | 10 | 92 | 73 | ½ |
|   | E | 258 | 4.0 | 95 | 105 | 94 | 78 | 0-½ |

[1] Parts per hundred parts of epoxy resin.
[2] Salt Fog test was run according to ASTM standard No. B-117-62, values reported are total corrosion creep in mm. from the scribe line after 740 hours.
[3] After exposure in the Weather-O-Meter at 100° F.

EXAMPLE 5

Additional coatings were prepared using different curing schedules. The hardener (Hardener F) was prepared according to the procedure of Example 1 from 120 gms. of methacrylic acid, 625 gms. of butyl acrylate, 335 gms. of methyl methacrylate and 10 gms. of catalyst in a solvent consisting of 1100 gms. of isobutyl alcohol and 100 gms. of ispropyl alcohol. The polymer in this case was reacted with 120 gms. of N-(2-aminoethyl) aziridine in place of ethylenimine to produce Hardener F having an AHEW of about 331.

Hardener F was then mixed with a glycidyl polyether of bisphenol A having an epoxide equivalent weight of about 535 and applied as a 1.5–1.7 mil coating on a steel panel, cured and evaluated. Three tests were made:

(a) A formulation containing Hardener F at a 100 phr. level was cured for 6 days at 25° C.

(b) The same formulation above was cured for 10 minutes at 110° C. followed by 4 minutes at 250° C.

(c) A formulation containing Hardener F at a 61 phr. level (stoichiometric) was cured for 45 minutes at 110° C.

All three formulations gave coatings having good to excellent resistance to solvents and good physical properties.

Similar results were obtained when N-(2-cyanoethyl) aziridine or N-(2-phenylethyl) aziridine was used to prepare the hardeners for the epoxy coating compositions. Similar results were obtained when the methacrylic acid is replaced with acrylic acid.

EXAMPLE 6

Hardener G was prepared according to the procedure of Example 1 from 120 gms. of methacrylic acid, 625 gms. of butyl acrylate, 335 gms. of methyl methacrylate in a solvent consisting of 900 gms. of xylene, 200 gms. of isobutyl alcohol and 100 gms. of isopropyl alcohol. The polymer was then reacted with 120 gms. of ethylenimine. Hardener G had an AHEW of about 378.

A pigmented epoxy enamel was prepared by grinding together in a ball mill 396 parts of a glycidyl polyether of bisphenol A dissolved in 86 parts of MIBK and 46 parts of xylene, 595 parts of titanium dioxide, 73 parts of xylene and 258 parts of diacetone alcohol. The resulting enamel had an epoxide equivalent weight of about 2150, contained 25.6% resin solids and 44.5% pigment solids.

To 215 parts of this enamel were added 100 parts of 2-ethoxyethyl acetate and then 78 parts of Hardener G and the whole thoroughly blended. The final mixture contained 23.6% resin solids and 24.3% pigment solids.

Coatings were prepared as before and cured by baking for 30 minutes at 120° C. and tested. The coatings had good physical properties and excellent solvent resistance. Comparative coatings were made using stoichiometric amounts of diethylene triamine or the polyamide (wt./wt. based on epoxy resin) in place of Hardener G. All the coated panels were equally exposed to intense ultra violet light for 300 hours at 170° F. (blackbody temperature).

After 300 hours the polyamide cured coating had turned yellow, noticeably, and the amine cured coating had undergone a severe loss in gloss so that its appearance was dull and chalky. In contrast the Hardener G cured coatings had neither become yellow or undergone any appreciable loss in gloss, indicative of chalking. Similar results were found when the coatings were allowed to air dry at room temperature for 10–14 days.

EXAMPLE 7

Hardener H was prepared according to the procedure of Example 1 from 940 gms. butyl methacrylate, 120 gms. methacrylic acid and 10 gms of catalyst in a solvent consisting of 600 gms. xylene, 100 gms. isopropyl alcohol, and 500 gms. of isobutyl alcohol. The vinyl polymer was then reacted with 140 gms. of N-(3-aminopropyl) aziridine giving a polymer having an AHEW of about 452.

About 40 parts of Hardener H was blended with about 60 parts of a glycidyl polyether of bisphenol A having an epoxide equivalent weight of about 535 (solids basis) and cast as a clear film on a steel panel. The film was cured at 250° F. for 30 minutes. The physical and solvent resistance properties of the cured film were excellent. The impact resistance was 50 in.-lbs. forward and 30 in.-lbs. reverse and the coating passed a ⅛″ conical mandrel bend. A spot test with MEK showed no softening after 60 seconds and no softening after 10 minutes exposure to xylene.

EXAMPLE 8

A vinyl polymer containing pendant glycidyl groups was prepared by polymerizing 200 gms. of glycidyl methacrylate, 400 gms. of butyl acrylate, 600 gms. of methyl methacrylate and 4 gms. of azobisisobutyronitrile in a solvent consisting of 900 gms. of xylene and 300 gms. of 2-ethoxyethyl acetate. The polymerization was conducted below 90° C. and after the addition of monomers the mixture was digested at 85° C. for 12 hours. After cooling the vinyl-glycidyl polymer solution contained 49.1% resin solids, had a viscosity of 97 seconds Gardner-Holt and a calculated epoxide equivalent weight of 198.

Hardener G was mixed in stoichiometric amounts with the vinyl-glycidyl polymer and 1 mil clear films were cast on steel panels. Three different curing schedules were used as follows:

(1) Force dried at 130° F. for 15 minutes and baked at 250° F. for 30 minutes.

(2) Air dried for 24 hours at 75° F. and baked at 250° F. for 30 minutes.

(3) Air cured at 75° F. for 10 days.

All the films had good solvent resistance, high gloss and impact resistance of about 30 in.-lbs.

EXAMPLE 9

The order of addition of the various reactants in preparing these coatings is not critical as shown in this example.

A carboxylated acrylic polymer was prepared in a typical polymerization procedure from the following ingredients:

|  | Gms. |
|---|---|
| Butyl acrylate | 590 |
| Methyl methacrylate | 514 |
| Methacrylic acid | 96 |
| Tert-butyl perbenzoate | 10 |
| Xylene | 900 |
| i-Butanol | 300 |

The polymerization was carried out at 100° C. for 18 hours. The finished enamel contained 49.2% resin solids. The carboxyl equivalent weight was 1075, and viscosity was 21.4 seconds, Gardner-Holt tube. This product was used as follows: 200 gms. were mixed with 133 gms. of a 75% solids solution in methyl i-butyl ketone of a glycidyl polyether of bisphenol A having an epoxide equivalent weight of about 535. This mixture was thinned with 2-ethoxyethyl acetate to 40% solids, and 8.1 gms. of N-(2-aminoethyl) aziridine was added. The mixture was allowed to stand for one hour with occasional shaking, then a 1.2 mil film was cast on two steel panels. One was air dried for four hours, then baked 30 minutes at 250° F. The other was allowed to cure at room temperature for 10 days. The cured film properties were:

| Cure | Impact resistance | Solvent resistance | Flexibility | Gloss |
|---|---|---|---|---|
| Baked | 30 in-lb. forward and reverse. | MEK excellent, xylene excellent. | ⅛″ mandrel, no cracks. | Excellent. |
| Air-dried | do | MEK very good, xylene excellent. | do | Do. |

Coatings prepared according to this invention have the desirable properties of improved resistance to yellowing and high retention of gloss while maintaining a good balance of the other physical and solvent resistance properties. Such epoxy coating compositions are useful for coating a variety of substrates and are particularly valuable for use as exterior protective coatings without the failings usually associated with epoxy coatings, i.e. chalking and yellowing. Additionally the coatings can be cured at room temperature as well as by accelerated curing at elevated temperatures without a significant variation in properties. Further, the adhesive characteristics of the coatings are also improved when compared with the more commonly known polyalkylene polyamine or polyamide hardening agents. Although there are many amine hardening agents known, there were none known before the present invention which would provide all of the above properties, particularly resistance to yellowing and chalking.

While preferred embodiments of the invention have been described above, various modifications may be made therein without departing from the scope of the invention as set forth in the claims.

What is claimed is:

1. An epoxy coating composition having improved resistance to yellowing which comprises an organic solvent solution of (A) a vinyl polymer containing pendant groups having the formula $$-\overset{O}{\overset{\|}{C}}-O-Z-\overset{H}{\underset{}{N}}-R$$

where Z is a lower alkylene group of 2 to 4 carbon atoms of which at least 2 carbon atoms extend in a chain between the O and the N atoms and R is selected from the group consisting of $-CH_2CH_2C\equiv N$

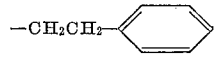

and $(-ANH)_nH$ where $n$ is an integer of 1 to 4 and A is a lower alkylene group of 2 to 4 carbon atoms of which at least 2 carbon atoms extend in a chain between the nitrogen atoms, said vinyl polymer having been prepared from 1–20% by weight of an ethylenically unsaturated mono or dicarboxylic acid, the balance of the monomers having been selected from the group consisting of vinyl aromatic hydrocarbons, acrylic monomers and vinyl monomers, wherein said carboxylic acid is reacted with (a) at least 2 moles of an alkylenimine per mole of carboxylic acid or, (b) at least 1 mole of N-(aminoalkyl) aziridine per mole of carboxylic acid to form the pendant nitrogen groups of the above formula; and (B) a polyepoxide having more than one epoxide group per molecule; said vinyl polymer added in such proportions so as to provide about 0.5 to about 1.5 amine hydrogen equivalent weight per each epoxide equivalent weight.

2. The composition of claim 1 wherein the polyepoxide is a glycidyl polyether of a polyhydric phenol or a polyhydric alcohol.

3. The composition of claim 1 wherein the polyepoxide is a vinyl polymer containing pendant glycidyl groups comprising in polymerized form from about 5 to about 50 percent by weight of a monomer having both a vinyl and a glycidyl group and the balance to make 100 percent of at least one other copolymerizable vinyl monomer containing no groups reactive with a glycidyl group.

4. The composition of claim 3 wherein the glycidyl containing monomer is glycidyl methacrylate.

5. The composition of claim 1 wherein said vinyl polymer has an amine hydrogen equivalent weight of about 200 to about 2000.

6. An epoxy coating composition having improved resistance to yellowing which comprises:

(A) a vinyl polymer containing pendant groups having the formula $$-\overset{O}{\overset{\|}{C}}-O-Z-\overset{H}{\underset{}{N}}-R$$

where Z is a lower alkylene group of 2 to 4 carbon atoms of which at least 2 carbon atoms extend in a chain between the O and the N atoms and R is selected from the group consisting of $-CH_2CH_2C\equiv N$

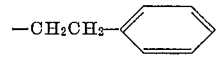

and $(-ANH)_nH$ where $n$ is an integer of 1 to 4 and A is a lower alkylene group of 2 to 4 carbon atoms of which at least 2 carbon atoms extend in a chain between the nitrogen atoms, said vinyl polymer having been prepared from 1–20% by weight of an ethylenically unsaturated mono or dicarboxylic acid, the balance of the monomers having been selected from the group consisting of vinyl aromatic hydrocarbons, acrylic monomers and vinyl monomers, wherein said carboxylic acid is reacted with (a) at least 2 moles of an alkylenimine per mole of carboxylic acid or, (b) at least 1 mole of N-(aminoalkyl) aziridine per mole of carboxylic acid to form the pendant nitrogen groups of the above formula.

(B) a polyepoxide having more than one epoxide group per molecule; said vinyl polymer added in such proportions so as to provide about 0.5 to about 1.5 amine hydrogen equivalent weight per each epoxide equivalent weight.

7. The composition of claim 6 wherein the polyepoxide is a glycidyl polyether of a polyhydric phenol or a polyhydric alcohol.

8. The composition of claim 6 wherein the polyepoxide is a vinyl polymer containing pendant glycidyl groups comprising in polymerized form from about 5 to about 50 percent by weight of a monomer having both a vinyl and a glycidyl group and the balance to make 100 percent of at least one other copolymerizable vinyl monomer containing no groups reactive with a glycidyl group.

9. The composition of claim 8 wherein the glycidyl containing monomer is glycidyl methacrylate.

10. The composition of claim 6 wherein said vinyl polymer has an amine hyrogen equivalent weight of about 200 to about 2000.

11. A coating comprising the cure composition of claim 6.

12. The process comprising applying to a substrate a layer of the composition of claim 1, drying to evaporate the solvent and curing.

References Cited

UNITED STATES PATENTS

| 3,228,823 | 1/1966 | Usala et al. | 260—836 |
| 3,399,248 | 8/1968 | Wolinski | 260—836 |

FOREIGN PATENTS

| 897,726 | 5/1962 | Great Britain. |

PAUL LIEBERMAN, Primary Examiner

U.S. Cl. X.R.

260—32.8, 33.4, 33.6, 37, 41, 47, 78.5, 86.1, 836